A. C. SCHUMAN.
RESILIENT WHEEL.
APPLICATION FILED JAN. 30, 1920.
1,359,925.
Patented Nov. 23, 1920.
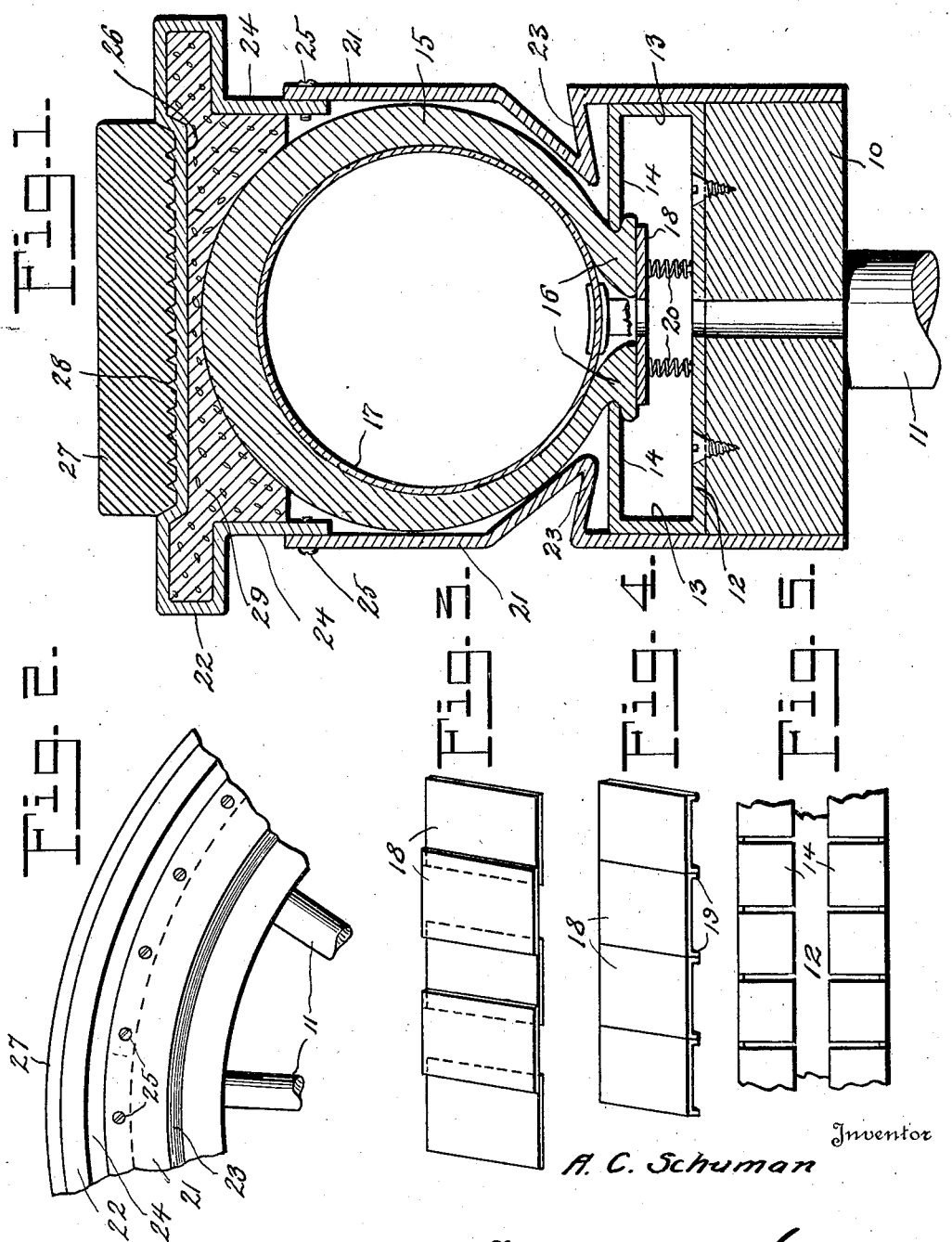
Inventor
A. C. Schuman
By Max A. Schmidt
Attorney

UNITED STATES PATENT OFFICE.

ALEXANDER C. SCHUMAN, OF LOUISVILLE, KENTUCKY.

RESILIENT WHEEL.

1,359,925.　　　　　Specification of Letters Patent.　　Patented Nov. 23, 1920.

Application filed January 30, 1920. Serial No. 355,128.

*To all whom it may concern:*

Be it known that I, ALEXANDER C. SCHUMAN, a citizen of the United States, residing at Louisville, in the county of Jefferson and State of Kentucky, have invented certain new and useful Improvements in Resilient Wheels, of which the following is a specification.

This invention relates to wheels for motor vehicles, and more particularly to a wheel which is cushioned or resilient, the cushioning effect being obtained primarily by a pneumatic tire.

The invention has for its object to provide a wheel of the kind stated in which the primary cushioning element is an ordinary pneumatic tire composed of an outer casing and an inflatable inner tube.

The invention also has for its object to provide the wheel with additional cushioning means to obtain greater resiliency, and also to provide the primary cushioning element hereinbefore referred to with a protecting housing or cover to prevent damage and to preclude the possibility of punctures.

With the objects stated in view the invention consists in a novel combination and arrangement of parts to be hereinafter described and claimed, and in order that the same may be better understood, reference is had to the accompanying drawing forming a part of this specification.

In the drawing—

Figure 1 is a cross section of the felly and tire of the wheel; Fig. 2 is a side elevation of a fragment of said parts; Figs. 3 and 4 are perspective views of details and Fig. 5 is a plan view of a further detail.

Referring specifically to the drawing, 10 denotes the usual felly of a wheel and 11 denotes the spokes. The hub structure has not been illustrated as it forms no part of the present invention. The drawing shows a fragment of the felly only, as this suffices for an understanding of the invention.

On the felly 10 is mounted and rigidly secured by any suitable means, a pneumatic tire supporting member consisting of a flat ring 12 seating on the outer surface of the felly and having continuous outstanding marginal flanges 13 coinciding with the sides of the felly and projecting radially. The outer ends of these flanges are formed with inturned resilient tongues 14 overhanging the ring 12 in spaced relation therewith. The tongues of the respective side flanges are spaced from each other at their inner ends so that the base portion of an ordinary tire casing 15 may seat therebetween, the clencher beads 16 of said casing being engaged by the ends of the tongues. The casing 15 contains the usual inflatable inner tube 17, and these parts form the primary or main cushioning element of the wheel.

Beneath the base of the clencher beads 16 seats a series of spring-supported plates 18 providing a support for the base of the casing. These plates are arranged in overlapping relation at their ends as shown in Fig. 3; or they may abut at their ends as shown in Fig. 4, with said ends being provided with abutting flanges 19 to prevent relative displacement.

Between the ring 12 and the plates 18 are located coiled springs 20, suitably anchored to the ring. The springs keep the plates 18 firmly pressed against the base of the clencher beads 16, and as the tongues 14 are resilient, the tire casing 15 is free to move bodily in a radial direction, this movement being cushioned by the springs and the tongues. The resiliency of the wheel is therefore not only obtained from the resiliency of the main cushioning element itself, but also from the resilient mounting thereof.

The tire casing 15 is completely housed in at the tread and sides. This housing comprises side members 21 and a tread member 22. The side members 21 are annular plates which seat alongside the casing 15, the flanges 13 and the felly 10. At the outer ends of the flanges 13, the plates 21 have inturned ridges 23 forming abutments to limit the inward movement of the tire, these abutments being normally spaced from the outer ends of the flanges 13. If the tire should become deflated when in use, the abutments come in contact with the tongues 14 as the tire flattens, and the tire is now prevented from damage by being completely flattened out.

The tread member 22 is located transversely of the tread portion of the casing 15 and spaced therefrom, and at its ends it has inturned flanges 24 lapping the plates 21 for a short distance and secured thereto by screws or other suitable fasteners 25.

In the center of the tread member 22 is a depression 26 in which is embedded a tread ring 27 of solid rubber or other suitable material. The wall of the depression is shown provided with barbs or spurs 28 to assist in firmly holding the tread ring in place.

The space between the tread member 22 and the tread of the tire casing 15 contains a filler 29 of suitable resilient material. It will therefore be seen that the entire assembly of parts constituting the housing for the casing 15 and the tread of the wheel moves bodily with the casing 15 as it is deformed in response to the load placed thereon.

A wheel constructed as hereinbefore described has a maximum resiliency; the tire casing 15 is not exposed and hence there is no possibility of punctures. The filler 29 reduces wear of the casing to a minimum. If the inner tube 17 should happen to become deflated, the tire cannot get so flat as to become damaged, as the ridges 23 prevent excessive inward displacement, and if it is not practical to make repairs at once, the tire may be continued in use as it still has considerable resiliency due to the spring support at the base, and the spring support of the housing obtained by the engagement of the ridges 23 with the resilient tongues 14.

The tread 27 may be plain or provided with an anti-skid surface, and various changes and modifications in the structure and the arrangement of the other parts may be made without a departure from the spirit and scope of the invention as claimed hereinafter.

The parts 18, 12 and 10 have alined openings as shown in Fig. 1 to receive the valve stem of the tube 17.

I claim—

1. The combination with the felly of a wheel; of a ring mounted thereon and having marginal outstanding flanges, resilient tongues at the outer ends of the flanges, said tongues being inturned toward each other and spaced at their ends, a pneumatic tire casing seating at its base between the inner ends of the tongues and engageable thereby, and a backing plate beneath the base of the tire casing.

2. The combination with the felly of a wheel; of a ring mounted thereon and having marginal outstanding flanges, resilient tongues at the outer ends of the flanges, said tongues being inturned toward each other and spaced at their ends, a pneumatic tire casing seating at its base between the inner ends of the tongues and engageable thereby, a backing plate beneath the base of the tire casing, and a resilient support for the backing plate.

3. The combination with the felly of a wheel; of a ring mounted thereon and having marginal outstanding flanges, resilient tongues at the outer ends of the flanges, said tongues being inturned toward each other and spaced at their ends, a pneumatic tire casing seating at its base between the inner ends of the tongues and engageable thereby, a backing plate beneath the base of the tire casing, a resilient support for the backing plate, a housing inclosing the tire at its tread and sides, said housing being spaced from the tread of the tire, and a resilient filler in said space.

4. The combination with the felly of a wheel; of a ring mounted thereon and having marginal outstanding flanges, resilient tongues at the outer ends of the flanges, said tongues being inturned toward each other and spaced at their ends, a pneumatic tire casing seating at its base between the inner ends of the tongues and engageable thereby, a backing plate beneath the base of the tire casing, a resilient support for the backing plate, a housing inclosing the tire at its tread and sides, said housing being spaced from the tread of the tire, a resilient filler in said space and means for limiting the inward movement of the housing.

5. The combination with the felly of a wheel; of a ring mounted thereon and having marginal outstanding flanges, resilient tongues at the outer ends of the flanges, said tongues being inturned toward each other and spaced at their ends, a pneumatic tire casing seating at its base between the inner ends of the tongues and engageable thereby, a backing plate beneath the base of the tire casing, a resilient support for the backing plate, a housing inclosing the tire at its tread and sides, said housing being spaced from the tread of the tire, a resilient filler in said space, and abutments on the sides of the housing opposite the extremities of the aforesaid flanges for limiting the inward movement of the housing.

6. The combination with the felly of a wheel; of a pneumatic tire carried thereby, a housing inclosing the tire at its tread and sides, said housing being spaced on the inside from the tread of the tire, a resilient filler in said space, abutments on the sides of the housing, and resilient supporting members carried by the felly and positioned to intercept the abutments upon abnormal inward movement of the housing.

7. The combination with the felly of a wheel; of a pneumatic tire carried thereby, a housing inclosing the tire at its tread and sides, said housing being spaced on the inside from the tread of the tire, and the outside of the tread portion of the housing having a cushion tire, a resilient filler in the aforesaid space, abutments on the sides of the housing, and resilient supporting members carried by the felly and positioned to intercept the abutments upon abnormal inward movement of the housing.

In testimony whereof I affix my signature.

ALEXANDER C. SCHUMAN.